United States Patent [19]
Keneko et al.

[11] Patent Number: 5,453,217
[45] Date of Patent: Sep. 26, 1995

[54] LIQUID CRYSTAL COMPOSITION AND LIQUID CRYSTAL DISPLAY DEVICE

[75] Inventors: Masaharu Keneko, Yamato; Masami Kadowaki, Kawasaki, both of Japan

[73] Assignee: Mitsubishi Chemical Corporation, Tokyo, Japan

[21] Appl. No.: 168,162

[22] Filed: Dec. 17, 1993

[30] Foreign Application Priority Data

Dec. 17, 1992 [JP] Japan .................. 4-337540

[51] Int. Cl.$^6$ .................. C09K 19/00; C09K 19/32; C09K 19/36; G02F 1/13
[52] U.S. Cl. .................. 252/299.1; 252/299.62; 252/299.7; 359/103
[58] Field of Search .................. 252/299.1, 299.62, 252/299.7

[56] References Cited

U.S. PATENT DOCUMENTS

| | | | |
|---|---|---|---|
| 4,426,312 | 1/1984 | Claussen et al. | 252/299.1 |
| 4,490,015 | 12/1984 | Kawarada et al. | 359/77 X |
| 4,507,221 | 3/1985 | Imazeki et al. | 252/299.1 |
| 4,528,113 | 7/1985 | Imazeki et al. | 252/299.1 |
| 4,600,527 | 7/1986 | Imezeki et al. | 252/299.1 |
| 4,721,779 | 1/1988 | Etzbach | 534/577 |
| 4,737,310 | 4/1988 | Imazeki et al. | 252/299.1 |
| 4,935,160 | 6/1990 | Scheuble et al. | 252/299.1 |

FOREIGN PATENT DOCUMENTS

| | | |
|---|---|---|
| 0110205 | 6/1984 | European Pat. Off. . |
| 3165482 | 7/1988 | Japan . |
| 3165483 | 7/1988 | Japan . |
| 40429389 | 10/1992 | Japan . |

*Primary Examiner*—C. Harris
*Attorney, Agent, or Firm*—Oblon, Spivak, McClelland, Maier & Neustadt

[57] ABSTRACT

A liquid crystal composition comprising a fluorine liquid crystal material and at least one azo dichroic dye selected from each of the groups (A), (B), (C) and (D) represented by the following general formulae (I)–(IV):

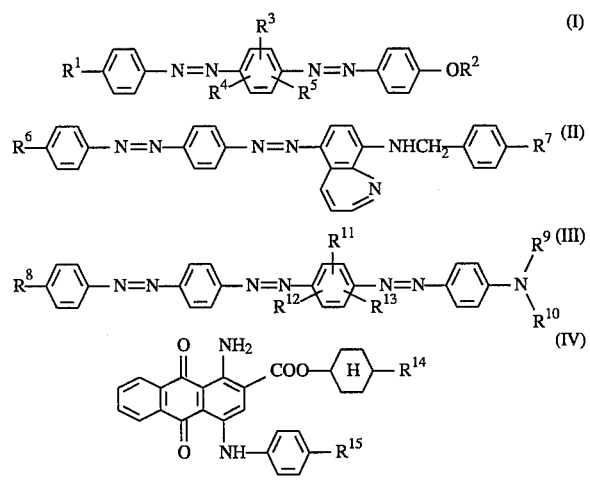

16 Claims, 1 Drawing Sheet

LIQUID CRYSTAL COMPOSITION AND LIQUID CRYSTAL DISPLAY DEVICE

FIELD OF THE INVENTION

The present invention relates to a liquid crystal composition for a liquid crystal display device which is used as a display device or the like, and a liquid crystal display device utilizing such liquid crystal composition.

BACKGROUND OF THE INVENTION

Recently liquid crystal displays have been desired which have high-performance display quality closely approaching the performance of usual displays or Braun tubes. With the problems involving response time, contrast, visual angle characteristics and the like, it has been difficult to provide such liquid crystal displays according to the simple matrix-driven system using the super twist nematic liquid crystals (STN) or the like of the prior art. Therefore the active matrix-driven system has been proposed which employs an active element such as thin-film transistor or the like.

For active matrix-driven displays, charge is supplied to each pixel only during the line access time. Therefore, it is important for each pixel to hold this charge over the frame time in order to realize maximum brightness and contrast ratio.

In other words, the voltage holding ratio has a very important significance for active matrix-driven displays. At low voltage holding ratios, the voltage supplied across the pixel electrode and the opposite electrode drops during the field cycle.

That is, the effective voltage applied to the liquid crystal lowers, thereby causing a drastic decrease in contrast, and thus the provision of high-performance displays has been difficult.

Thus it has become necessary to use a liquid crystal material with a high capacity of holding charge over the frame time, i.e., a material having a high voltage holding ratio.

For these liquid crystal elements there have usually been used, instead of the cyano group-containing liquid crystal materials of the prior art, fluorine liquid crystal materials with a substituent comprising a fluorine atom, e.g., fluorine atom itself, fluoromethyl group such as trifluoromethyl group or fluoromethoxy group such as trifluoromethoxy group, which are hard to include ionic impurities. With addition of a dichroic dye thereto, these fluorine liquid crystal materials, however, often raise a problem of greatly spoiled voltage holding properties, for which the utilization of active matrix-driven liquid crystal display devices by making use of guest-host liquid crystal compositions has been difficult.

In addition, relating to these dichroic dyes and guest-host liquid crystal compositions with them added thereto, it is difficult to determine whether the spoiling of the voltage holding properties is due to the influence of the ionic impurities which are included in the dye or is caused by the molecular structure of the dye, for which and some other reasons the cause-effect relationship between the voltage holding ratio and the other parameters has not been elucidated.

SUMMARY OF THE INVENTION

The object of the present invention is to provide a color liquid crystal composition with a high voltage holding ratio and liquid crystal display device, which can be a solution to the problem of the prior art mentioned above.

Aiming to solve the above-described problem of the spoiled voltage holding ratio for guest-host liquid crystal compositions, we the inventors have made intensive investigations and, as a result, we have found that the combined use of plural dichroic dyes of certain molecular structures and a fluorine liquid crystal material makes it possible to keep the voltage holding ratio of guest-host liquid crystal compositions at 80% or more, preferably 90% or more, of that of host liquid crystal materials, thus having achieved the present invention.

In brief, the present invention resides in a liquid crystal composition characterized by containing a fluorine liquid crystal material and at least one dichroic dye selected from each of the groups (A), (B), (C) and (D) described hereinafter and a liquid crystal display device characterized by comprising such liquid crystal composition sandwiched between electrode plates at least one of which is transparent.

Hereunder a more detailed explanation will be made of the present invention.

DETAILED DESCRIPTION OF THE INVENTION

Figure 1:
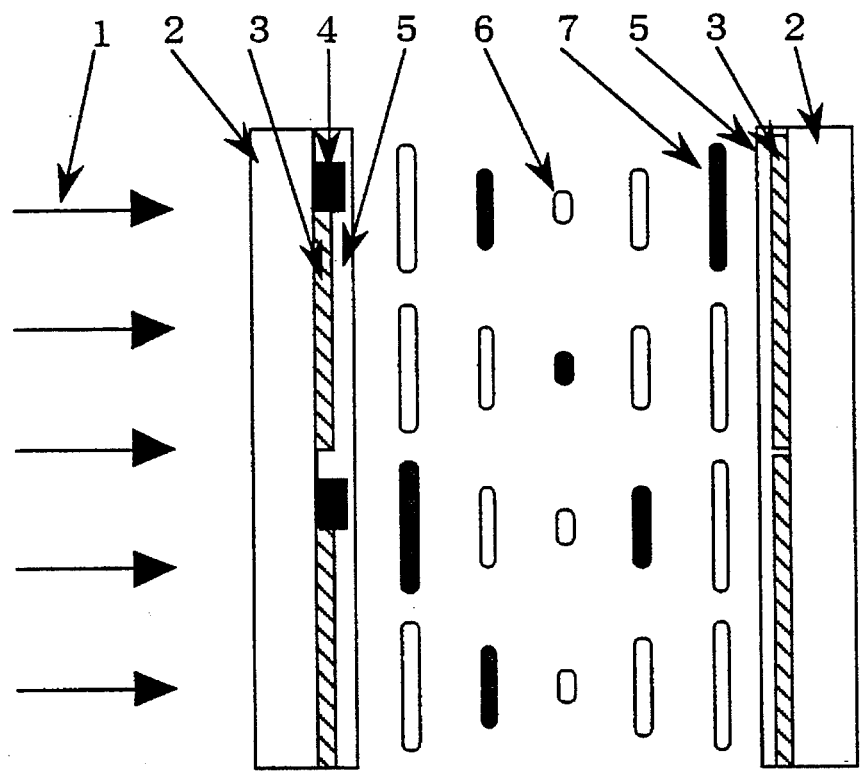
FIG. 1 is a schematic sectional view of a guest-host type of liquid crystal device according to the present invention which is in the state where no voltage is applied thereto.

The liquid crystal composition according to the present invention has hues of black, dark blue, brown and so on, and the dyes used according to the present invention produce expected effects when they are combinations of dichroic dyes belonging to the respective groups referred to hereunder, all of which are publicly known. The dyes represented by the general formula (I) given below are described in, for example, U.S. Pat. No. 4,737,310, those represented by the general formula (II) given below, in, for example, U.S. Pat. No. 4,600,527 and those represented by the general formula (IV) given below, in, for example, U.S. Pat. No. 4,507,221, respectively.

Also the dyes represented by the general formula (III) are described in Japanese Patent Laid-Open No. 301850/88 et al., some of which are commercially available from Nihon Kanko Sikiso Inc.

Hereunder the details of the dyes available for use according to the present invention will be explained.

Group (A): Azo dichroic dyes represented by the following general formula (I):

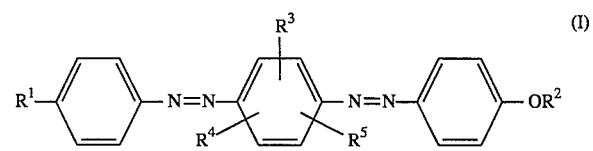

wherein $R^1$ usually represents a hydrogen atom, alkyl group, alkoxyalkyl group, alkoxy group, halogen atom, or cyclohexyl or phenyl group which may be substituted with an alkyl group, alkoxy group, halogen atom or alkoxyalkyl group, preferably a hydrogen atom, alkyl group, alkoxyalkyl group or alkoxy group, and more preferably a $C_{1-12}$ alkoxy group;

$R^2$ usually represents an alkyl group, alkoxyalkyl group, or cyclohexylmethyl or benzyl group which may be substituted with an alkyl group, alkoxyalkyl group, alkoxy group or halogen atom, preferabl

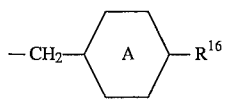

wherein

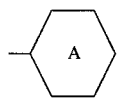

epresents a cyclohexyl or phenyl group, and $R^{16}$ represents a hydrogen atom, an alkyl group, alkoxyalkyl group, alkoxy group or halogen atom, and more preferably

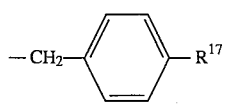

wherein $R^{17}$ represents a $C_{1-12}$ alkoxy group; and usually $R^3$–$R^5$ each represents a hydrogen atom, methyl group, methoxy group or halogen atom, or $R^4$ and $R^5$ may be connected to each other to form an aromatic ring when they are located on neighboring carbon atoms, preferably $R^3$ represents a hydrogen atom or methyl group, and more preferably a hydrogen atom, and preferably $R^4$ and $R^5$ each represent a hydrogen atom or are located on neighboring carbon atoms to be connected to each other thereby forming an aromatic ring, and more preferably $R^4$ and $R^5$ are located on neighboring carbon atoms to be connected to each other thereby forming a naphthylene group as a whole together with the phenylene group to which they combine.

Group (B): Azo dichroic dyes represented by the following general formula (II):

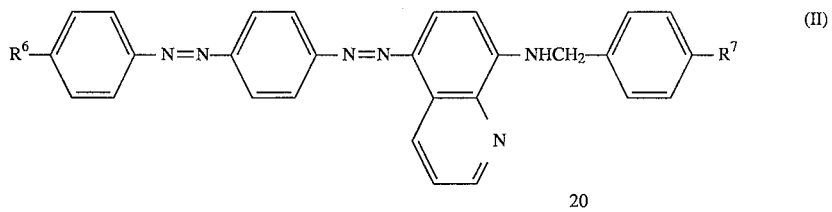

(II)

wherein $R^6$ and $R^7$ each usually represents a hydrogen atom, alkyl group, alkoxyalkyl group, alkoxy group, halogen atom, or cyclohexyl or phenyl group which may be substituted with an alkyl group, alkoxy group, alkoxyalkyl group or halogen atom, preferably a hydrogen atom, alkyl group, alkoxyalkyl group, alkoxy group

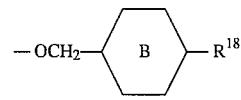

wherei

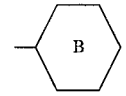

represents a phenyl or cyclohexyl group, and $R^{18}$ represents a hydrogen atom, alkyl group or alkoxy group, or halogen atom, and more preferably $R^6$ represents a $C_{1-12}$ alkyl group, and $R^7$ represents an $C_{1-12}$ alkoxy group.

Group (C): Azo dichroic dyes represented by the following general formula (III):

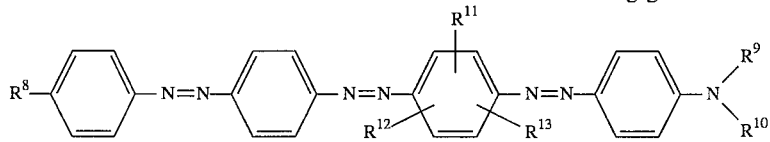

(III)

wherein $R^8$–$R^{10}$ each usually represents a hydrogen atom, alkyl group, alkoxyalkyl group, alkoxy group, halogen atom, or cyclohexyl or phenyl group which may be substituted with an alkyl group, alkoxy group, halogen atom or alkoxyalkyl group, preferably an alkyl group, alkoxyalkyl group or alkoxy group, and more preferably a $C_{1-12}$ alkyl group; and $R^{11}$–$R^{13}$ each usually represents a hydrogen atom, methyl group, methoxy group or halogen atom, or $R^{12}$ and $R^{13}$ may be connected to each other to form an aromatic ring when they are located on neighboring carbon atoms, preferably $R^{11}$ represents a hydrogen atom, and $R^{12}$ and $R^{13}$ are connected to each other to form an aromatic ring when they are located on neighboring carbon atoms, and more preferably $R^{11}$ represents a hydrogen atom, and $R^{12}$ and $R^{13}$ are located on neighboring carbon atoms to be connected to each other thereby forming a naphthylene group as a whole together with the phenylene group to which they combine.

Group (D): Anthraquinone dichroic dyes represented by the following general formula (IV):

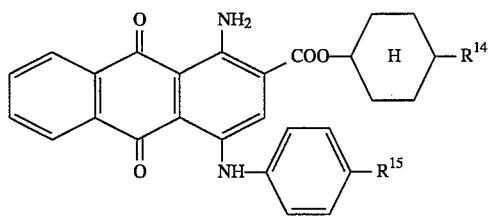

wherein $R^{14}$ and $R^{15}$ each usually represents a hydrogen atom; alkyl group; alkoxyalkyl group; alkoxy group; halogen atom; or cyclohexyl or phenyl group which may be substituted with an alkyl group, alkoxyalkyl group, halogen atom or alkoxy group, preferably $R^{14}$ represents an alkyl group, alkoxy group or alkoxyalkyl group, and $R^{15}$ represents a hydrogen atom, alkyl group, alkoxy group or alkoxyalkyl group, and more preferably $R^{14}$ and $R^{15}$ each represents a $C_{1-12}$ alkyl group.

Examples of the alkyl group used for the definition of $R^1$, $R^2$, $R^6$–$R^{10}$, $R^{14}$ and $R^{15}$ in the general formulae (I), (II), (III) and (IV) given above include $C_{1-12}$ linear and branched alkyl groups such as methyl group, ethyl group, propyl group, butyl group, pentyl group, hexyl group, octyl group, nonyl group, dodecyl group, etc.; examples of the alkoxy group include $C_{1-12}$ linear and branched alkyl groups which correspond to the above-enumerated alkyl groups; examples of the alkoxyalkyl group include $C_{2-8}$ linear and branched alkyl groups, e.g., methoxymethyl group, buthoxymethyl group, ethoxyethyl group, buthoxyethyl group and so on; and examples of the halogen atom include fluorine atom, chlorine atom, bromine atom, etc. The above-listed examples are also illustrations of the substituents of the substituted cyclohexyl group, substituted cyclohexylmethyl group, substituted phenyl group and substituted benzyl group in $R^1$, $R^2$, $R^6$–$R^{10}$, $R^{14}$ and $R^{15}$.

At least one is selected from each of those groups for use according to the present invention, and for the combined use of the dyes, and selection is made preferably of desired ones of the respective groups, and most preferably of the most desired ones chosen from each of the groups. Here, the dye selected from each of the groups is not necessary to be one, and two or more may be selected therefrom for use.

Examples of these dyes of the respective groups used according to the present invention are enumerated in Table-1 given below.

TABLE 1

General Formula I:

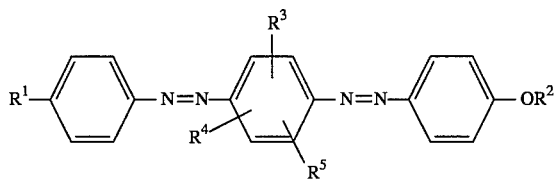

| Dyes | $R^1$ | $R^2$ | $R^3$ | $R^4$ | $R^5$ |
|---|---|---|---|---|---|
| I-1 | $C_8H_{17}(n)$ | $CH_2$—⟨phenyl⟩—$OC_5H_{11}(n)$ | H | Connected to each other to form apart of a naphthalene ring. | |
| I-2 | $C_8H_{17}(n)$ | $CH_2$—⟨phenyl⟩—$OC_7H_{15}(n)$ | H | Connected to each other to form apart of a naphthalene ring. | |
| I-3 | $C_4H_9(n)$ | $CH_2$—⟨phenyl⟩—$OC_4H_9(n)$ | H | Connected to each other to form apart of a naphthalene ring. | |
| I-4 | $C_4H_9(n)$ | $CH_2$—⟨phenyl⟩—$OC_4H_9(n)$ | $CH_3$ | H | H |
| I-5 | $C_4H_9(n)$ | $CH_2$—⟨cyclohexyl(H)⟩—$C_4H_9(n)$ | H | Connected to each other to form apart of a naphthalene ring. | |

TABLE 1-continued

| I-6 | OC$_4$H$_9$(n) | 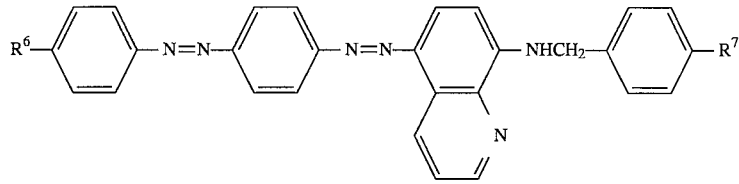 CH$_2$—⟨⟩—Cl | H | Connected to each other to form apart of a naphthalene ring. |
| I-7 | H | CH$_2$—⟨⟩—C$_4$H$_9$(n) | H | Connected to each other to form apart of a naphthalene ring. |
| I-8 | C$_4$H$_9$(n) | CH$_2$—⟨⟩ | H | H | H |

General Formula II:

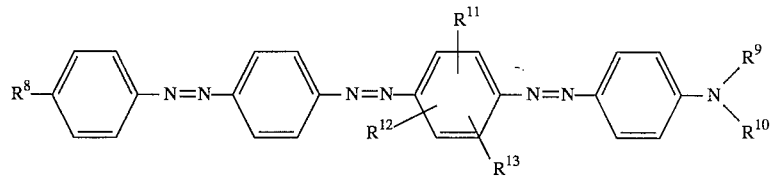

$$R^6\text{—}\langle\rangle\text{—N=N—}\langle\rangle\text{—N=N—}\langle\text{quinoline}\rangle\text{—NHCH}_2\text{—}\langle\rangle\text{—R}^7$$

Dyes

| | R$^6$ | R$^7$ |
|---|---|---|
| I-1 | C$_4$H$_9$(n) | OC$_4$H$_9$(n) |
| I-2 | C$_4$H$_9$(n) | OC$_5$H$_{11}$(n) |
| I-3 | C$_4$H$_9$(n) | H |
| I-4 | OC$_3$H$_7$(n) | OC$_4$H$_9$(n) |
| I-5 | Br | OC$_4$H$_9$(n) |
| I-6 | Br | C$_4$H$_9$(n) |
| I-7 | C$_4$H$_9$(n) | C$_7$H$_{15}$(n) |
| I-8 | OCH$_2$—⟨⟩—C$_4$H$_9$(n) | Cl |

General Formula III:

$$R^8\text{—}\langle\rangle\text{—N=N—}\langle\rangle\text{—N=N—}\langle\text{R}^{11},R^{12},R^{13}\rangle\text{—N=N—}\langle\rangle\text{—N}\begin{matrix}R^9\\R^{10}\end{matrix}$$

Dyes

| | R$^8$ | R$^9$ | R$^{10}$ | R$^{11}$ | R$^{12}$ | R$^{13}$ |
|---|---|---|---|---|---|---|
| III-1 | C$_4$H$_9$(n) | C$_2$H$_5$ | C$_2$H$_5$ | H | Connected to each other to form a part of a naphthalene ring. | |
| III-2 | C$_8$H$_{17}$(n) | C$_2$H$_5$ | C$_2$H$_5$ | H | Connected to each other to form a part of a naphthalene ring. | |
| III-3 | C$_4$H$_9$(n) | C$_3$H$_{7(n)}$ | C$_3$H$_{7(n)}$ | H | Connected to each other to form a part of a naphthalene ring. | |

General Formula IV:

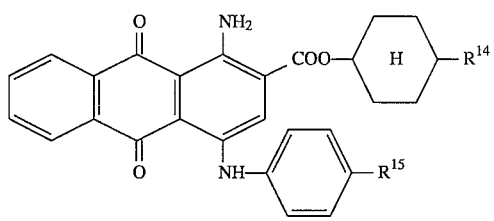

TABLE 1-continued

| Dyes | R⁶ | R⁷ |
|---|---|---|
| IV-1 | $C_4H_9(n)$ | $C_4H_9(n)$ |
| IV-2 | $C_4H_9(n)$ | $C_8H_{17}(n)$ |
| IV-3 | $C_3H_7(n)$ | Cl |
| I-4 | $C_4H_9(n)$ | $OCH_3$ |
| IV-5 | $C_8H_{17}(n)$ | H |
| IV-6 | $C_4H_9(n)$ | 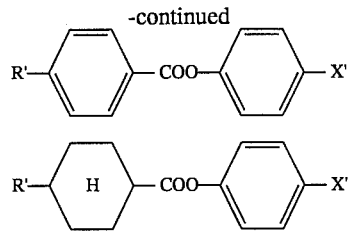 |

The liquid crystal material as used according to the present invention includes a fluorine liquid crystal material composition consisting mainly of liquid crystal materials with a substituent comprising a fluorine atom, e.g., fluorine atom itself, fluoromethyl group such as trifluoromethyl group or fluoromethoxy group such as trifluoromethoxy group, which are mixtures of various liquid crystal materials represented by the structural formulae given below, and having a voltage holding ratio of 95% or more even at a high temperature of 100° C.

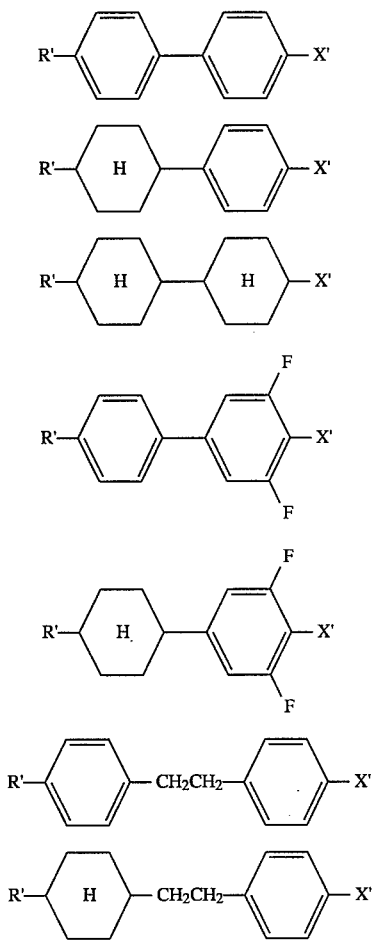

wherein R' and X' each represents independently alkyl group, alkoxyalkyl group, alkoxy group, alkylphenyl group, alkoxyalkylphenyl group, alkoxyphenyl group, alkylcyclohexyl group, alkoxyalkylcyclohexyl group, alkylcyclohexylphenyl group, halogen atom, fluoromethyl group such as trifluoromethyl group, fluoromethoxy group such as trifluoromethoxy group, alkylphenylalkyl group, alkoxyalkylphenylalkyl group, alkylcyclohexylalkyl group, alkoxyalkoxycyclohexylalkyl group, alkoxyphenylalkyl group, alkylcyclohexylphenylalkyl group, and the alkyl and alkoxy chains in the above-described respective groups may have optically active centers. In addition, the phenyl or phenoxy group in R' and X' may be further substituted with a halogen atom such as fluorine atom, chlorine atom or the like. The phenyl group in each of the formulae may be additionally substituted with one or two halogen atoms such as fluorine atoms or chlorine atoms.

Most of the liquid crystal materials mentioned above have positive dielectric anisotropy, but even publicly known liquid crystals having negative dielectric anisotropy may be employed if they are mixed with liquid crystals of positive dielectric anisotropy to produce liquid crystal materials whose dielectric anisotropy is positive on the whole. Moreover, even liquid crystal materials of negative dielectric anisotropy may be used alone by selection of an appropriate device structure and driving system.

Furthermore, the above-mentioned liquid crystal materials may contain additional additives, e.g., an optically active substance such as cholesteryl nonanoate, ultraviolet absorber, antioxidant, etc.

The liquid crystal composition according to the present invention may be easily prepared by dissolving at least one dye selected from each of the groups (A), (B), (C) and (D) in the liquid crystal material referred to above in a publicly known manner.

The quantity of the dyes to be used is 0.1–15% by weight, and preferably 0.5–5% by weight of the liquid crystal material.

The resulting guest-host liquid crystal composition usually has a voltage holding ratio of the guest-host liquid crystal composition/voltage holding ratio of the host liquid crystal material of 0.8 or more, and preferably 0.9 or more.

The thus prepared liquid crystal composition may be sandwiched between a pair of electrode plates at least one of which is transparent to construct a variety of display devices utilizing the guest-host effect, including, for example, the Heilmeier mode guest-host, phase transition mode guest-host and twist nematic (TN) mode guest-host described in "Handbook on Liquid Crystal Devices" edited by the 142nd committee of the Japan Society for the Promotion of Science, pp. 315–329, Nikkan Kogyo Shinbunsha, and elsewhere, the macromolecular dispersion mode guest-host described on pages 367–370 of the "Handbook on Liquid Crystal Devices", supra, and elsewhere.

As mentioned above, a variety of modes of liquid crystal display devices may be used according to the present invention, and particularly preferred is the phase transition mode producing a bright display, which is obtained by adding an optically active substance to a nematic liquid crystal composition and does not require the use of a polarizing plate which is usually a requisite.

Figure 2:
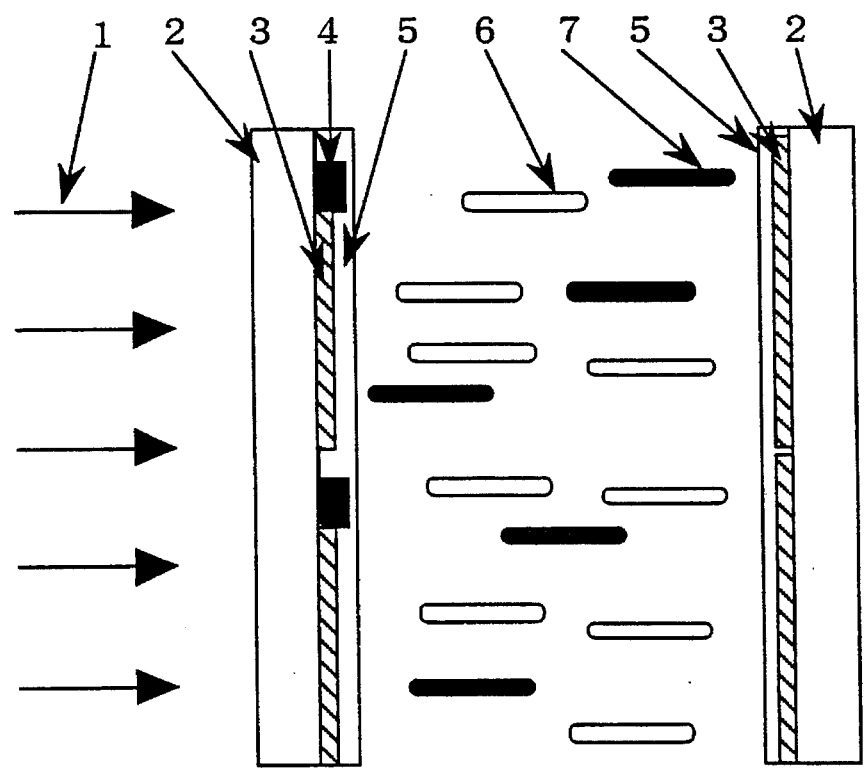
FIG. 2 is a schematic sectional view of a guest-host type of liquid crystal display device according to the present invention which is in the state where voltage is applied thereto.

As an embodiment of the liquid crystal display device of the present invention, schematic sectional views of an active-driven phase transition mode guest-host type of a liquid crystal display device are shown in FIGS. 1 and 2. FIG. 1 represents a state of a crystal display device where no voltage is applied, while FIG. 2 represents a state of a crystal display device where voltage is applied. In the figures, 1 is an incident light, 2 is a transparent glass plate, 3 is a transparent electrode, 4 is an active element, 5 is an alignment layer, 6 is a liquid crystal material, and 7 is a dichroic dye.

The liquid crystal material (6) shows a cholesteric phase when no voltage is applied (FIG. 1). As both the dichroic dye (7) and the liquid crystal material (6) have a cholesteric structure, the dye (7) is absorbed without using a polarizing plate even if the incident light (1) is natural light. When voltage is applied (FIG. 2), the liquid crystal material (6) and the dichroic dye (7) align in the direction of the electric field thereby transmitting the light.

Transmission and absorption of light in liquid crystal display devices can be controlled in this way depending on the presence or absence of electric field.

EXAMPLES

Hereunder the present invention will be concretely explained with reference to the Examples, which however never limit the present invention thereto.

EXAMPLE 1

Liquid crystal composition-I was prepared by dissolving the following dichroic dyes in 100 g of a liquid crystal mixture commercially available under the trade name of ZLI-4792 (manufactured by E. Merck Inc.) which consisted mainly of a fluorine compound.

| Dyes: | |
|---|---|
| (I-2) | 0.75 g |
| (II-1) | 0.20 g |
| (III-1) | 0.50 g |
| (IV-1) | 2.00 g |

This liquid crystal composition-I was sealed in a cell with a gap of 9 μm which comprised transparent electrodes-fitted glass substrates which had been subjected to application of a polyimide resin thereon followed by curing, and rubbing treatment for homogeneous alignment and was constructed in such a manner that the alignment-treated surfaces faced each other, thus preparing a liquid crystal device. This cell was baked at a constant temperature of 110° C. for 1 hour, after which at 25° C. pulse signals were applied thereto at a frame frequency of 30 Hz and a voltage of 5 V for an ON time of 60 μseconds for the determination of the voltage-holding ratio. The voltage-holding ratio of the guest-host liquid crystal composition/the voltage holding ratio of the host liquid crystal material was calculated to be a satisfactory value of 0.93.

EXAMPLE 2

Liquid crystal composition-II was prepared by dissolving the following dichroic dyes in 100 g of a liquid crystal mixture commercially available under the trade name of ZLI-5080 (manufactured by E. Merck Inc.) which consisted mainly of a fluorine compound.

| Dyes: | |
|---|---|
| (I-2) | 0.72 g |
| (II-1) | 0.23 g |
| (III-1) | 0.43 g |
| (IV-1) | 2.02 g |

This liquid crystal composition-II was sealed in a cell with a gap of 6 μm which comprised transparent electrodes-fitted glass substrates which had been subjected to application of a polyimide resin thereon followed by curing, and rubbing treatment for homogeneous alignment and was constructed in such a manner that the alignment-treated surfaces faced each other, thus preparing a liquid crystal device. This cell was baked at a constant temperature of 110° C. for 1 hour, after which at 70° C. pulse signals were applied thereto at a frame frequency of 30 Hz and a voltage of 5 V for an ON time of 60 μseconds for the determination of the voltage-holding ratio. The voltage-holding ratio of the guest-host liquid crystal composition/the voltage holding ratio of the host liquid crystal material was calculated to be a satisfactory value of 0.98.

EXAMPLE 3

Liquid crystal composition-III was prepared by dissolving the following dichroic dyes in 100 g of a liquid crystal mixture commercially available under the trade name of ZLI-5091 (manufactured by E. Merck Inc.) which consisted mainly of a fluorine compound.

| Dyes: | |
|---|---|
| (I-2) | 0.79 g |
| (II-1) | 0.25 g |
| (III-1) | 0.46 g |
| (IV-1) | 1.98 g |

This liquid crystal composition-III was employed in the same manner as in Example 2 for the preparation of a liquid crystal device. The result of the calculation of the voltage holding ratio of the guest-host liquid crystal composition/the voltage holding ratio of the host liquid crystal material which was made in the same manner as in Example 2 was a satisfactory value of 0.96.

EXAMPLE 4

Liquid crystal composition-IV was prepared by dissolving the following dichroic dyes in 100 g of a liquid crystal mixture commercially available under the trade name of ZLI-5092 (manufactured by E. Merck Inc.) which consisted mainly of a fluorine compound.

| Dyes: | |
|---|---|
| (I-2) | 0.75 g |
| (II-1) | 0.24 g |
| (III-1) | 0.54 g |
| (IV-1) | 2.07 g |

This liquid crystal composition-IV was employed in the same manner as in Example 2 for the preparation of a liquid crystal device. The result of the calculation of the voltage holding ratio of the guest-host liquid crystal composition/the voltage holding ratio of the host liquid crystal material which was made in the same manner as in Example 2 was a satisfactory value of 0.98.

EXAMPLE 5

Liquid crystal composition-V was prepared by dissolving the following dichroic dyes in 100 g of a liquid crystal mixture commercially available under the trade name of ZLI-4792 (manufactured by E. Merck Inc.) which consisted mainly of a fluorine compound.

| Dyes: | |
|---|---|
| (I-2) | 0.41 g |
| (II-1) | 0.11 g |
| (III-1) | 0.31 g |
| (IV-1) | 1.72 g |
| (IV-2) | 1.07 g |

This liquid crystal composition-V was employed in the same manner as in Example 2 for the preparation of a liquid crystal device. The result of the calculation of the voltage holding ratio of the guest-host liquid crystal composition/the voltage holding ratio of the host liquid crystal material which was made in the same manner as in Example 2 was a satisfactory value of 0.98.

EXAMPLE 6

Liquid crystal composition-VI was prepared by dissolving the following dichroic dyes in 100 g of a liquid crystal mixture commercially available under the trade name of ZLI-4792 (manufactured by E. Merck Inc.) which consisted mainly of a fluorine compound.

| Dyes: | |
|---|---|
| (I-1) | 0.89 g |
| (II-2) | 0.28 g |
| (III-1) | 0.22 g |
| (IV-2) | 2.09 g |

This liquid crystal composition-VI was employed in the same manner as in Example 2 for the preparation of a liquid crystal device. The result of the calculation of the voltage holding ratio of the guest-host liquid crystal composition/the voltage holding ratio of the host liquid crystal material which was made in the same manner as in Example 2 was a satisfactory value of 0.98.

EXAMPLE 7

Liquid crystal composition-VII was prepared by dissolving the following dichroic dyes in 100 g of a liquid crystal mixture commercially available under the trade name of ZLI-4792 (manufactured by E. Merck Inc.) which consisted mainly of a fluorine compound.

| Dyes: | |
|---|---|
| (I-2) | 1.24 g |
| (II-1) | 0.36 g |
| (III-1) | 0.23 g |
| (IV-1) | 1.88 g |

This liquid crystal composition-VII was employed in the same manner as in Example 1 for the preparation of a liquid crystal device. This cell was baked at a constant temperature of 110° C. for 1 hour, after which at 100° C. pulse signals were applied thereto at a frame frequency of 30 Hz and a voltage of 5 V for an ON time of 60 μseconds for the determination of the voltage holding ratio. The value of this voltage holding ratio was calculated in terms of the voltage holding ratio of the guest-host liquid crystal composition/the voltage holding ratio of the host liquid crystal material, a ratio determined with the voltage holding ratio of the host liquid crystal ZLI- 4792 as 1.

The result was a satisfactory value of 0.83.

Next, as comparisons, some of the publicly known combinations of dyes, dichroic dyes for liquid crystals, were dissolved in a fluorine liquid crystal and investigated.

COMPARISON 1

Liquid crystal composition-VIII was prepared by dissolving the following dichroic dyes as disclosed in Japanese Patent Laid-Opem No. 165483/88, in 100 g of a liquid crystal mixture commercially available under the trade name of ZLI-4792 (manufactured by E. Merck Inc.) which consisted mainly of a fluorine compound.

| Dyes: | |
|---|---|
| (I-2) | 1.16 g |
| (II-1) | 0.74 g |
| (IV-1) | 2.48 g |

Dye of the general structural formula (V) given below 1.51 g

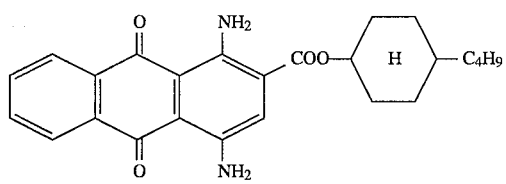

This liquid crystal composition-VIII was employed in the same manner as in Example 7 for the preparation of a liquid crystal device. The result of the calculation of the voltage holding ratio of the guest-host liquid crystal composition/the voltage holding ratio of the host liquid crystal material which was made in the same manner as in Example 7 was a low value of 0.64.

COMPARISON 2

Liquid crystal composition-IX was prepared by dissolving the following dichroic dyes as disclosed in Japanese Patent Laid-Open No. 43596/89, in 100 g of a liquid crystal mixture commercially available under the trade name of ZLI-4792 (manufactured by E. Merck Inc.) which consisted mainly of a fluorine compound.

| Dyes: | |
|---|---|
| (I-2) | 1.72 g |
| (IV-1) | 1.88 g |
| (V) | 1.73 g |

Dye of the general structural formula (VI) given below 1.87 g

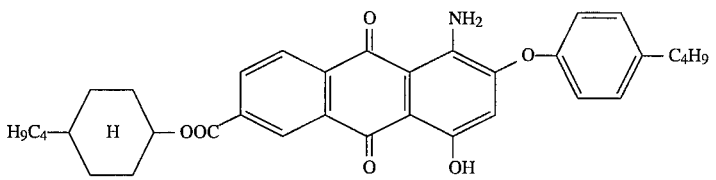

Dye of the general structural formula (VII) given below 1.41 g

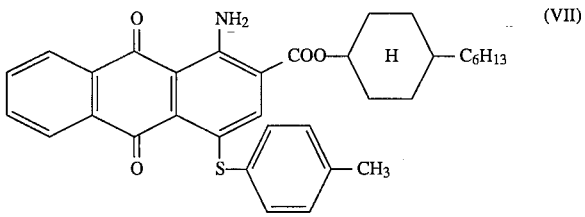

This liquid crystal composition-IX was employed in the same manner as in Example 7 for the preparation of a liquid crystal device. The result of the calculation of the voltage holding ratio of the guest-host liquid crystal composition/the voltage holding ratio of the host liquid crystal material which was made in the same manner as in Example 7 was a low value of 0.65.

COMPARISON 3

Liquid crystal composition-X was prepared by dissolving the following dichroic dyes as disclosed in Japanese Patent Laid-Open No. 154920/91, in 100 g of a liquid crystal mixture commercially available under the trade name of ZLI-4792 (manufactured by E. Merck Inc.) which consisted mainly of a fluorine compound.

| Dyes: | |
|---|---|
| (I-2) | 1.24 g |
| (II-1) | 0.36 g |
| (III-1) | 0.23 g |
| (IV-1) | 1.88 g |
| (V) | 1.04 g |

This liquid crystal composition-X was employed in the same manner as in Example 7 for the preparation of a liquid crystal device. The result of the calculation of the voltage holding ratio of the guest-host liquid crystal composition/the voltage holding ratio of the host liquid crystal material which was made in the same manner as in Example 7 was a low value of 0.65.

Thus it is still difficult to use the dyes which are known for their combined use as dichoric dyes for liquid crystals, for active matrix-driven liquid crystal devices if they cause a significant drop in the voltage holding ratio of the guest-host liquid crystal composition/the voltage holding ratio of the host liquid crystal material upon their dissolution in a fluorine liquid crystal.

As mentioned above, the present invention has an effect that the preparation of an active matrix liquid display device has become possible with a guest-host composition, and there may be obtained a display with an improved viewing angle and reproducibility of hues.

While the invention has been described in detail and with reference to the specific embodiments thereof, it will be apparent to one skilled in the art that various changes and modifications can be made without departing from the spirit and scope thereof.

What is claimed is:

1. A liquid crystal composition consisting essentially of:
   a liquid crystal material having a fluorine containing substituent and at least one dichroic dye selected from each of the following groups (A), (B), (C) and (D):

Group (A): Azo dichroic dyes represented by the following general formula (I):

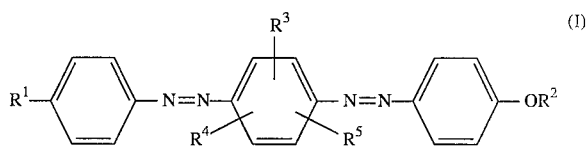

wherein $R^1$ represents a hydrogen atom; $C_{1-12}$ alkyl group; $C_{2-8}$ alkoxyalkyl group; $C_{1-12}$ alkoxy group;

halogen atom; or cyclohexyl or phenyl group which may be substituted with a $C_{1-12}$ alkyl group, $C_{2-8}$ alkoxy group, halogen atom or $C_{2-8}$ alkoxyalkyl group;

$R^2$ represents a $C_{1-12}$ alkyl group; $C_{2-8}$ alkoxyalkyl group; or cyclohexylmethyl or benzyl group which may be substituted with a $C_{1-12}$ alkyl group, $C_{2-8}$ alkoxyalkyl group, $C_{1-12}$ alkoxy group or halogen atom; and $R^3$-$R^5$ each represent a hydrogen atom, methyl group, methoxy group or halogen atom, or $R^4$ and $R^5$ together form an aromatic ring when they are located on neighboring carbon atoms;

Group (B): Azo dichroic dyes represented by the following general formula (II):

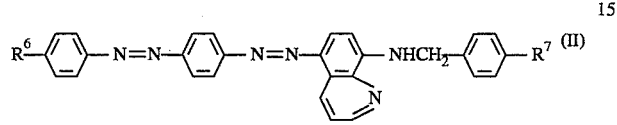

wherein $R^6$ and $R^7$ each represent a hydrogen atom; $C_{1-12}$ alkyl group; $C_{2-8}$ alkoxyalkyl group; $C_{1-12}$ alkoxy group; halogen atom; or cyclohexyl or phenyl group which may be substituted with a $C_{1-2}$ alkyl group, $C_{1-12}$ alkoxy group, $C_{2-8}$ alkoxyalkyl group or halogen atom;

Group (C): Azo dichroic dyes represented by the following general formula (III):

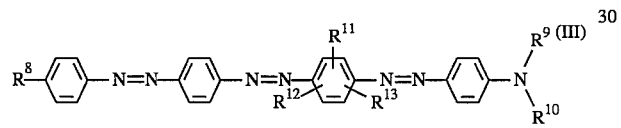

wherein $R^8$ represents a hydrogen atom; $C_{1-12}$ alkyl group; $C_{2-8}$ alkoxyalkyl group; $C_{1-12}$ alkoxy group; halogen atom; cyclohexyl or phenyl group which may be substituted with a $C_{1-12}$ alkyl group, $C_{1-12}$ alkoxy group, halogen atom or $C_{2-8}$ alkoxyalkyl group;

$R^9$ and $R^{10}$ each represent a $C_{1-12}$ alkyl group; $C_{1-12}$ alkoxy group; $C_{2-8}$ alkoxyalkyl group; halogen atom; or benzyl or cyclohexylmethyl group which may be substituted with a $C_{1-12}$ alkyl group, $C_{1-12}$ alkoxy group, $C_{2-8}$ alkoxyalkyl group or halogen atom; and $R^{11}$-$R^{13}$ each represent a hydrogen atom, methyl group, methoxy group or halogen atom, or $R^2$ and $R^{13}$ together form an aromatic ring when they are located on neighboring carbon atoms;

Group (D): Anthraquinone dichroic dyes represented by the following general formula (IV):

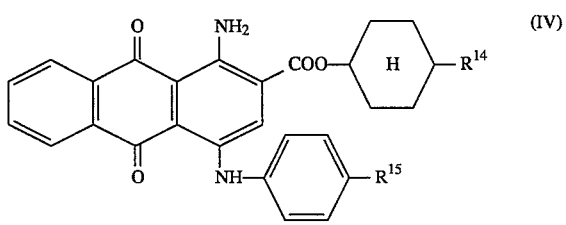

wherein $R^{14}$ and $R^{15}$ each represent a hydrogen atom; $C_{1-12}$ alkyl group; $C_{2-8}$ alkoxyalkyl group; $C_{1-12}$ alkoxy group; halogen atom; or cyclohexyl or phenyl group which may be substituted with a $C_{1-12}$ alkyl group, $C_{2-8}$ alkoxyalkyl group, halogen atom or $C_{1-12}$ alkoxy group.

2. A liquid crystal composition as claimed in claim 1, wherein said dye of the group (A) is represented by the formula (I) wherein $R^1$ represents a hydrogen atom, alkyl group, alkoxyalkyl group or alkoxy group; $R^2$ represent

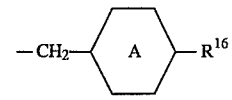

wherei

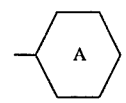

represents a cyclohexyl or phenyl group, and $R^{16}$ represents a hydrogen atom, an alkyl group, alkoxyalkyl group, alkoxy group or halogen atom; $R^3$ represents a hydrogen atom or methyl group; and $R^4$ and $R^5$ each represent a hydrogen atom or are located on neighboring carbon atoms together forming an aromatic ring.

3. A liquid crystal composition as claimed in claim 1, wherein said dye of the group (A) is represented by the formula (I) wherein $R^1$ represents a $C_{1-12}$ alkyl group; $R^2$ represent

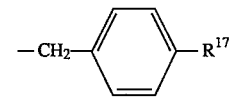

wherein $R^{17}$ represents a $C_{1-12}$ alkyl group; $R^3$ represents a hydrogen atom; and $R^4$ and $R^5$ are located on neighboring carbon atoms together forming a naphthylene group as a whole together with the phenylene group to which they combine.

4. A liquid crystal composition as claimed in claim 1, wherein said dye of the group (B) represented by the formula (II) wherein $R^6$ and $R^7$ each represent a hydrogen atom, alkyl group, alkoxyalkyl group, alkoxy group, halogen atom, o

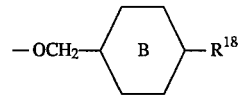

wherein

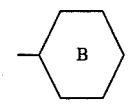

represents a cyclohexylene or phenylene group, and $R^{18}$ represents a hydrogen atom, an alkyl group or alkoxy group,.

5. A liquid crystal composition as claimed in claim 1, wherein said dye of the group (B) represented by the formula (II) wherein $R^6$ represents a $C_{1-12}$ alkyl group; and $R^7$ represents an $C_{1-12}$ alkoxy group.

6. A liquid crystal composition as claimed in claim 1, wherein said dye of the group (C) is represented by the formula (III) wherein $R^8$-$R^{10}$ each represent an alkyl group, alkoxyalkyl group or alkoxy group; $R^{11}$ represents a hydrogen atom; and $R^{12}$ and $R^{13}$ are located on neighboring carbon atoms together forming an aromatic ring.

7. A liquid crystal composition as claimed in claim 1, wherein said dye of the group (C) is represented by the formula (III) wherein $R^8$–$R^{10}$ each represent a $C_{1-12}$ alkyl group; $R^{11}$ represents a hydrogen atom; and $R^{12}$ and $R^{13}$ are located on neighboring carbon atoms together forming a naphthylene group as a whole together with the phenylene group to which they combine.

8. A liquid crystal composition as claimed in claim 1, wherein said dye of the group (D) represented by the formula (IV) wherein $R^{14}$ represents an alkyl group, alkoxyalkyl group or alkoxy group; and $R^{15}$ represents a hydrogen atom, alkyl group, alkoxyalkyl group, alkoxy group, halogen atom, or cyclohexyl or phenyl group which may be substituted with an alkyl group, alkoxyalkyl group or alkoxy group.

9. A liquid crystal composition as claimed in claim 1, wherein said dye of the group (D) is represented by the formula (IV) wherein $R^{14}$ and $R^{15}$ each represent a $C_{1-12}$ alkyl group.

10. A liquid crystal composition as claimed in claim 1, wherein said dyes of the respective groups represented by the formula (I) wherein $R^1$ represents a $C_{1-12}$ alkyl group; $R^2$ represent

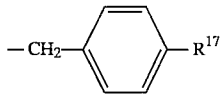

wherein $R^{17}$ represents a $C_{1-12}$ alkyl group; $R^3$ represents a hydrogen atom; and $R^4$ and $R^5$ each represent a hydrogen atom or are located on neighboring carbon atoms together forming a naphthylene group as a whole together with the phenylene group to which they combine; the formula (II) wherein $R^6$ represents a $C_{1-12}$ alkyl group; and $R^7$ represents an $C_{1-12}$ alkoxy group; the formula (III) wherein $R^8$–$R^{10}$ each represent a $C_{1-12}$ alkyl group; $R^{11}$ represents a hydrogen atom; and $R^{12}$ and $R^{13}$ are located on neighboring carbon atoms together forming a naphthylene group as a whole together with the phenylene group to which they combine; and the formula (IV) wherein $R^{14}$ and $R^{15}$ each represent a $C_{1-12}$ alkyl group.

11. A liquid crystal composition as claimed in claim 1, wherein said the quantity of the dyes used is 0.1–15% by weight with respect to the liquid crystal material.

12. A liquid crystal composition as claimed in claim 1, wherein the quantity of the dyes used is 0.5–5% by weight with respect to the liquid crystal material.

13. A liquid crystal display device comprising a liquid crystal composition as claimed in claim 1, sandwiched between a pair of electrode plates at least one of which is transparent.

14. A liquid crystal composition as claimed in claim 1, further consisting essentially of additional additives, wherein said additives do not reduce a voltage holding ratio of said liquid crystal composition below 0.8.

15. A liquid crystal composition as claimed in claim 14, wherein said additives are at least one member selected from the group consisting of optically active substances, ultraviolet absorbers and antioxidants.

16. A liquid crystal composition as claimed in claim 1, further consisting essentially of another liquid crystal material, wherein said another liquid crystal material does not reduce a voltage holding ratio of said liquid crystal composition below 0.8.

* * * * *

UNITED STATES PATENT AND TRADEMARK OFFICE
CERTIFICATE OF CORRECTION

PATENT NO. : 5,453,217
DATED : September 26, 1995
INVENTOR(S) : Masaharu KANEKO, et al.

It is certified that error appears in the above-indentified patent and that said Letters Patent is hereby corrected as shown below:

On the title page, Items [19] and [75], the first inventor's last name is listed incorrectly. It should read:

[19] --Kaneko et al.--

[75] --Kaneko--

Signed and Sealed this

Fifth Day of December, 1995

Attest:

BRUCE LEHMAN

*Attesting Officer*

*Commissioner of Patents and Trademarks*